United States Patent Office 3,506,669
Patented Apr. 14, 1970

3,506,669
DERIVATIVES OF 2,4-DIAMINO-3-
THIOPHENECARBOXYLIC ACID
Real Laliberte, Laval, Quebec, Canada, assignor to American Home Products Corporation, New York, N.Y., a corporation of Delaware
No Drawing. Filed Mar. 20, 1968, Ser. No. 714,442
Int. Cl. C07d 29/34, 63/12
U.S. Cl. 260—293.4       20 Claims

ABSTRACT OF THE DISCLOSURE

There are disclosed herein the 2,4-diaminothiophene-3-N-methylcarboxamide, 3-carboxanilide, 3-N-piperidinocarboxamide and 3-carboxylic acid N,N-dimethyl hydrazide, as well as the corresponding 3-carboxylic acid ethyl ester in which the amino group in position 2 is substituted by the methyl, allyl, tert-butyl, phenyl, 3-nitrophenyl, benzyl, and cyclohexyl groups, the amino group in position 4 may also be acetylated and which are furthermore substituted in position 5 with acetyl, benzoyl, 4-chlorobenzoyl, and 4-phenylbenzoyl groups. The compounds have amoebicidal and anthelmintic properties, and methods for their preparation and use are also given.

The present invention relates to derivatives of 2,4-diamino-3-thiophenecarboxylic acid of Formula I

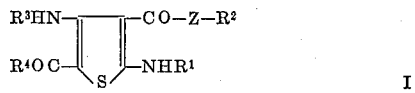

in which $R^1$ represents a lower alkyl group containing from 1 to 4 carbon atoms, the allyl group, the phenyl group, the 3-nitrophenyl group, the benzyl group, or the cyclohexyl group; Z represents NH or O (oxygen); $R^2$ represents a lower alkyl group containing from 1 to 2 carbon atoms, the phenyl group, the dimethylamino, or the piperidino group; $R^3$ represents hydrogen or the acetyl group; and $R^4$ represents the methyl, the phenyl, the 4-chlorophenyl and the 4-biphenylyl group.

The new derivatives of 2,4-diamino-3-thiophenecarboxylic acid of this invention have been found to possess interesting pharmacological properties. More particularly, these compounds, in standard pharmacological tests, for example, in a procedure similar to that described by Laidlaw et al. in Parasitology, vol. 20, page 207 (1928) have exhibited utility as amoebicidal agents, especially active against Entamoeba histolytica.

When the compounds of this invention are employed as amoebicidal agents in warm-blooded animals, for example, in hamsters or in rats, according to the method described in Experimental Chemotherapy, vol. 1, page 420–424, Academic Press (1963), they may be administered orally to rats in the form of suspensions formulated with appropriate suspending agents, for example, with gum arabic.

When giving the compounds to hamsters the preferred method of administration is by intraperitoneal injection of the dose to be used in 0.1 ml. of an aqueous vehicle. Such suspensions are preferably prepared by dissolving the compounds in a minimum amount of dimethyl sulfoxide and diluting that solution with water, if necessary in the presence of gum arabic, to the required concentration. All the above operations have to be carried out with sterile materials and under sterile conditions so as to obtain sterile suspensions.

In the production of certain vaccines it is preferred to use the monkey as the host animal and such monkeys have to be kept under observation for a period of time of several weeks before using them in the actual production of vaccines. During that period the monkeys infected with Entamoeba histolytica may be treated with the compounds of this invention by the oral route as described above.

The dosage of the present therapeutic agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

Generally, treatment of small animals is carried out by oral administration as described above with doses of the compounds of this invention of from 2 to 20 mg. per kilogram body weight per day, for a period of four days, and in monkeys by oral administration of the compounds of this invention in doses of from 5 to 50 mg. per kilogram body weight per day for periods of four days. The preferred dosage levels for small animals are 4 to 10 mg. per kilogram body weight per day, and for monkeys 15 to 25 mg. per kilogram body weight per day. Individual variations will occur, but the above dosage levels are the ones most desirable employed in order to achieve effective results.

The new compounds of this invention have also been found to possess the interesting pharmacological property of removing certain parasites from the intestinal tract of animals. More particularly, these compounds, in standard pharmacological tests, for example, in a procedure similar to that described by J. S. Steward, in Parasitology, vol. 45, page 231 (1955) have exhibited utility as anthelminthic agents against Syphacia obvelata.

When the compounds of this invention are employed as anthelminthic agents in warm-blooded animals, e.g. mice alone or in combination with pharmacologically acceptable carriers, the proportion of which is determined by the solubility and chemical nature of the compounds, chosen route of administration and standard biological practice. For example, they may be administered orally in solid form containing such excipients as starch, milk sugar, certain types of clay and so forth. They may also be administered orally in the form of solutions or suspensions, and the latter are most advantageously prepared by dissolving the compounds of this invention in the minimum amount of dimethyl sulfoxide, diluting such a solution with water, if necessary in the presence of a suspendeding agent such as, for example, gum arabic. In the treatment of horses it is most advantageous to dilute the compounds of this invention in the dry state with an excipient such as, for example, lactose, and to distribute the pre-mix thus obtained into the feed of the horse.

The dosage of the present therapeutic agents will vary with the form of administration and the particular compound chosen. Furthermore, it will vary with the particular hose under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective resutls without causing any harmful or deleterious side effects. In the treatment of horses and of pets dosage levels of the compounds of this inventoin from 100 to 500 mg. per kilogram body weight per day may be employed, although as aforementioned variations will occur. However, dosage levels in the range about 200 mg. per kilogram body weight per day are most desirably employed in order to achieve effective results. Such medication is administered once and the animal is then observed for a period of a few days. Treatment may be repeated in the same manner as described above it the desired results have not been obtained after the first administration.

More specifically the compounds of this invention are prepared by reacting together, in solution in a lower alkanol an isothiocyanate of the formula $R^1NCS$ (II) in which $R^1$ is as defined above, with substantially one molar equivalent of an alkali metal salt of a cyanoacetic acid derivative of the formula $NC-CH(Met)-CO-Z-R^2$ (III) in which Met represents an alkali metal and Z and $R^2$ are as defined above, to yield the corresponding alkali metal salt of the 3-amino-2-cyano-3-mercaptoacrylic acid derivative of the Formula IV in which $R^1$, $R^2$, Z, and Met are as defined above. This last-named compound may be isolated, but such isolation is not necessary and either the reaction mixture or the intermediate of Formula IV may be treated directly with substantially one molar equivalent of a halomethyl ketone of the formula V, $R^4COCH_2X$ in which $R^4$ is as defined above and X represents chlorine or bromine, in solution in a lower alkanol. When using intermediates of Formula IV in this reaction in which Z represents the group NH the reaction is carried out most advantageously at temperatures between 0° and 40° C., and preferably at 5°–10° C.; when Z in the above intermediate of Formula IV represents O (oxygen), this reaction is preferably carried out at elevated temperatures close to the reflux temperature of the reaction mixture. In both cases the corresponding derivative of 2,4-diamino-3-thiophenecarboxylic acid of Formula I in which $R^3$ represents hydrogen is obtained.

The 2,4-diamino-3-thiophenecarboxylic acid derivatives of Formula I in which $R^3$ represents hydrogen obtained as above may be acetylated in the conventional manner, by treatment with acetic anhydride in pyridine solution to yield the corresponding compound of Formula I in which $R^3$ represents the acetyl group.

The following examples and formulae, in which $R^1$, $R^2$, $R^3$, $R^4$, and Z have the significance defined above will illustrate this invention. All compounds are identified by elemental analysis.

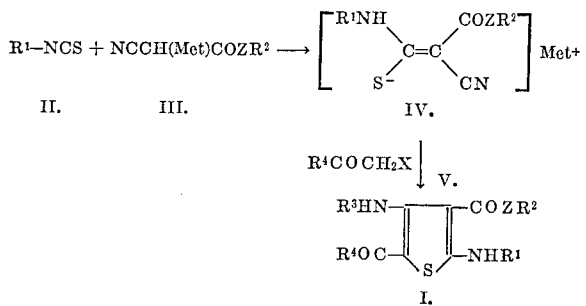

EXAMPLE 1

3-Anilino-2-cyano-3-mercapto-N-methylacrylamide

Methyl cyano acetamide (0.051 mole) and 0.051 mole of phenyl isothiocyanate are added to a solution of sodium ethoxide (0.112 mole of sodium in 100 ml. of ethanol). The mixture is refluxed for one and one-half hours, filtered and the filtrate evaporated to dryness. The sodium salt of 3-anilino-2-cyana-3-mercapto-N-methyl-acrylamide is obtained as a yellow oil which is dissolved in water and on acidification with hydrochloric acid, a yellow solid is formed which is filtered off and crystallized from methanol, toluene and isopropanol, to yield the title compound with M.P. 154–156° C.

EXAMPLE 2

4-amino-2-anilino-5-benzoylthiophene-3-N-methylcarboxamide

To a 250 ml., 3-neck, round bottom flask, fitted with a mechanical stirrer, a condenser and a dropping funnel, 0.02 mole of sodium in 100 ml. of ethanol and 0.02 mole of 3-anilino-2-cyano-3-mercapto-N-methylacrylamide, obtained as described Example 1 are added. The solution is cooled to 5° C. and 0.2 mole of 2-chlorocetophenone in 50 ml. of ethanol is added dropwise through the dropping funnel with constant stirring, while the reaction temperature is kept at 5° C. The mixture is allowed to stay at this temperature for one hour. After evaporation of the solvent, a yellow solid is filtered off, washed several times with water and isopropanol, and crystallized twice from isopropanol, to give the title compound with M.P. 207–209° C. (dec.).

EXAMPLE 3

4-amino-2-anilino-5-benzoylthiophene-3-carboxanilide

To a solution of sodium ethoxide (0.075 mole) in 250 ml. of ethanol 0.075 mole of N-phenylcyanoacetamide and 0.085 mole of phenyl isothiocyanate are added. The mixture is heated on a steam bath for one hour, filtered and the filtrate is poured in a 500 ml. 3-neck, round bottom flask, fitted with a mechanical stirrer, a thermometer and a dropping funnel. The solution is cooled to 5° C. using an ice bath, and 0.11 mole of 2-chloroacetophenone in 200 ml. of ethanol is added dropwise through the dropping funnel with constant stirring and keeping the reaction temperature between 5° and 10° C. The mixture is then kept 2 hours at this temperature. The yellow solid formed is filtered off, washed several times with water and isopropanol and crystallized from 2-methoxyethanol, to give the title compound with M.P. 228–230° C. (dec.).

EXAMPLE 4

4-amino-2-anilino-5-(4-phenylbenzoyl)-thiophene-3-carboxanilide

To a solution of sodium ethoxide (0.026 mole) in 100 ml. of ethanol, 0.025 mole of N-phenylcyanoacetamide and 0.028 mole of phenyl isothiocyanate are added. The mixture is heated on a steam bath for one hour, cooled, filtered and the filtrate is poured in a 250 ml., 3-neck round bottom flask, fitted with a mechanical stirrer, and a thermometer. The solution is cooled to 5° C., and 0.04 mole of α-bromo-p-phenyl-acetophenone is added portionwise over a period of 10 minutes with constant stirring and keeping the reaction temperature between 5° and 10° C. The mixture is kept at this temperature for one hour, the yellow solid which separates from the solution is filtered off, washed several times with water and isopropanol and crystallized from 2-methoxyethanol, to give the title compound with M.P. 256–258° C. (dec.).

EXAMPLE 5

4-amino-2-anilino-5(4-phenylbenzoyl)-thiophene-3-N-methylcarboxamide

To a solution of sodium ethoxide (0.02 mole) in 75 ml. of ethanol, 0.02 mole of N-methyl-cyanoacetamide and 0.02 mole of phenyl isothiocyanate are added. The mixture is heated on the steam bath for one and a half hours, filtered and the filtrate is pored in a 250 ml., 3-neck, round bottom flask fitted with a mechanical stirrer and a thermometer. The solution is cooled to 5° C., and 0.03 mole of α-bromo-p-phenylacetophenone is added portionwise with constant stirring, the temperature being kept between 5° and 10° C. The mixture is left at this temperature for one hour and the yellow solid which separates from the solution is filtered off, washed several times with water and isopropanol and crystallized from 2-ethoxythanol, to give the title compound with M.P. 251–253° C. (dec.).

EXAMPLE 6

4-amino-5-benzoyl-2-(3-nitroanilino)-thiophene-3-carbanilide

To a solution of sodium ethoxide (0.03 mole) in 100 ml. of ethanol, 0.03 mole of N-phenylcyanoacetamide and 0.035 mole of m-nitrophenyl isothiocyanate are added. The mixture is heated on the steam bath for one hour, filtered, and the filtrate is poured in a 500 ml. 3-neck, round bottom flask, fitted with a mechanical stirrer, a thermometer and a dropping funnel. 2-chloroacetophenone (0.045 mole) in 100 ml. of ethanol is added dropwise through the dropping funnel with constant stirring with the temperature being kept between 5° and 10° C. The mixture is kept at this temperature for one hour and on evaporation of the solvent a yellow solid is obtained. It is filtered off, washed several times with water and isopropanol and crystallized from 2-ethoxyethanol, to give the title compound with M.P. 213–215° C. (dec.).

EXAMPLE 7

4-amino-5-benzoyl-2-(3-nitroanilino)-thiophene-3-N-methylcarboxamide

To a solution of sodium ethoxide (0.043 mole) in 150 ml. of ethanol, 0.043 mole of N-methylcyanoacetamide and 0.043 mole of m-nitrophenyl isothiocyanate are added. The mixture is heated on the steam bath for one hour, filtered, the filtrate cooled to 5° C. and poured in a 500 ml., 3-neck, round bottom flask, fitted with a mechanical stirrer, a thermometer and a dropping funnel. 2-chloroacetophenone (0.05 mole) in 100 ml. of ethanol is added dropwise through the dropping funnel with constant stirring, the temperature being kept between 5° and 10° C. The mixture is kept one hour at this temperature, filtered and on evaporation of the solvent a yellow solid is obtained. It is filtered off, washed several times with water and isopropanol and is crystallized from 2-ethoxyethanol, to give the title compound with M.P. 259–260° C. (dec.).

EXAMPLE 8

4-amino-2-anilino-5-(4-chlorobenzoyl)-thiophene-3-n-methylcarboxamide

To a solution of sodium ethoxide (0.04 mole) in 100 ml. of ethanol, 0.04 mole of N-methylcyanoacetamide and 0.04 mole of phenyl isothiocyanate are added. The mixture is heated on a steam bath for one and a half hours, filtered, and the filtrate is poured in a 250 ml., three-neck, round bottom flask, fitted with a mechanical stirrer and a thermometer. 0.043 mole of α-bromo-p-chloroacetophenone is added portionwise with constant stirring, keeping the reaction temperature between 5° and 10° C. The mixture is kept at room temperature for one hour after the addition and the solid which precipitates is filtered off, dissolved in chloroform, washed with 2% sodium hydroxide and then with water. On evaporation of the chloroform under reduced pressure the yellow solid formed is filtered off and is crystallized from acetonitrile, to give the title compound with M.P. 233–235° C. (dec.).

EXAMPLE 9

4-amino-5-benzoyl-2-methylamino-thiophene-3-N-methylcarboxamide

To a solution of sodium ethoxide (0.12 mole) in 300 ml. of ethanol, 0.12 mole of N-methylcyanoacetamide and 0.12 mole of methyl isothiocyanate are added. The mixture is heated on the steam bath for 2 hours, filtered and the filtrate is cooled to 5° C., and poured in a 1-litre, 3-neck, round bottom flask, fitted with a mechanical stirrer, a thermometer and a dropping funnel. 2-chloroacetophenone (0.15 mole) in 250 ml. of ethanol is added dropwise through the dropping funnel with constant stirring and keeping the reaction temperature between 5° and 10° C. After the addition, the mixture is kept for two hours at room temperature and the solid which precipitates is filtered off, and washed with water and isopropanol. The filtrate is evaporated to dryness to give an oily solid which is dissolved in chloroform and washed with water. Evaporation of the chloroform yields a solid which is filtered off. Both solid portions are combined and crystallized from acetonitrile, to give the title compound with M.P. 220–222° C.

EXAMPLE 10

5-acetyl-4-amino-2-anilinothiophene-3-carboxanilide

To a solution of sodium ethoxide (0.1 mole) in 300 ml. of ethanol, 0.1 mole of N-phenylcyanoacetamide and 0.1 mole of phenyl isothiocyanate are added. The mixture is heated on the steam bath for one hour, filtered, the filtrate is cooled to 5° C. and poured in a 500 ml., 3-neck, round bottom flask, fitted with a mechanical stirrer, a thermometer and a dropping funnel. 2-chloropropanone (0.15 mole) is added dropwise through the dropping funnel with constant stirring. The temperature is kept between 5° and 10° C. for two hours. The solid precipitating out is filtered off, and the filtrate is evaporated to dryness to give an oily solid which is dissolved in chloroform and washed with water. The yellow solid obtained by evaporation is washed with hot isopropanol, filtered, and crystallized from acetonitrile, to give the title compound with M.P. 223–225° C.

EXAMPLE 11

2-allylamino-4-amino-5-benzoylthiophene-3-N-methylcarboxamide

To a solution of sodium ethoxide (0.04 mole) in 100 ml. of ethanol, 0.04 mole of N-methylcyanoacetamide and 0.04 mole of allyl isothiocyanate are added. The mixture is heated on the steam bath for two hours, filtered, and the filtrate is cooled to 5° C. and poured in a 250 ml., 3-neck, round bottom flask, fitted with a mechanical stirrer, a thermometer and a dropping funnel. 2-chloroacetophenone (0.05 mole) in 100 ml. of ethanol is added dropwise through the dropping funnel with constant stirring, the temperature being kept between 5° and 10° C. The mixture is kept for two hours at this temperature. The solvent is removed under reduced pressure, and the black oily solid which is formed is extracted with chloroform and washed with water. The chloroform is removed under reduced pressure to give a black oil which is dissolved in benzene and is triturated with hexane until a clear solution is obtained. The solution is kept at room temperature for a few hours to give a solid which is filtered off and crystallized from n-propanol, to give the title compound with M.P. 127–128° C.

EXAMPLE 12

4-amino-2-anilino-5-benzoylthiophene-3-carboxylic acid N,N-dimethyl hydrazide To a solution of sodium ethoxide (0.1 mole of sodium in 150 ml. of ethanol) 0.1 mole of cyanoacetic acid N,N-dimethyl hydrazide and 0.09 mole of phenyl isothiocyanate are added. The mixture is heated on the steam bath for one hour, filtered, and the filtrate is cooled to 5° C. and poured in a 500 ml., 3-neck, round bottom flask, fitted with a mechanical stirrer, a thermometer, and a dropping funnel. 2-chloroacetophenone (0.12 mole) in 150 ml. of ethanol is added dropwise through the dropping funnel with constant stirring and keeping the reaction temperature between 5° and 10° C. The mixture is kept for two hours at this temperature, the solid formed is filtered off, and the filtrate is evaporated to dryness to give a solid which is dissolved in chloroform and washed with water. Upon removal of the chloroform under reduced pressure a yellow solid is obtained, filtered off and crystallized from acetonitrile, to give the title compound with M.P. 232–234° C.

EXAMPLE 13

4-amino-2-anilino-5-benzoylthiophene-3-N-piperidino-carboxamide

A mixture of cyanoacetic acid ethyl ester (0.2 mole) and of N-aminopiperidine (0.2 mole) is left at room temperature for four days. The resulting solid is crystallized from isopropanol to give 2-cyano-N-(1-piperidinyl)-acetamide with M.P. 131° C.

To a solution of sodium ethoxide (0.043 mole in 100 ml. of ethanol) 0.047 mole of 2-cyano-N-(1-piperidinyl)-acetamide and 0.045 mole of phenyl isothiocyanate are added. The mixture is heated on the steam bath for one hour, filtered, and the filtrate is cooled to 5° C. and poured in a 500 ml., 3-neck, round bottom flask, fitted with a mechanical stirrer, a thermometer and a dropping funnel. 2-chloroacetophenone (0.059 mole) in 100 ml. of ethanol is added dropwise through the dropping funnel with constant stirring, the temperature being kept between 5–10° C. After two hours at this temperature the yellow solid formed is filtered off and washed with water and isopropanol. Some of the compound is recovered from the filtrate by extraction with chloroform and evaporation of the latter. Both solids are combined and crystallized from 2-methoxyethanol with addition of water, to give the title compound with M.P. 243–245° C.

EXAMPLE 14

4-acetamido-2-anilino-5-benzylthiophene-3-N-methylcarboxamide

To 0.017 mole of 4-amino-2-anilino-5-benzoylthiophene-3-N-methylcarboxamide (obtained as described in Example 2) in 100 ml. of benzene, 0.102 mole of acetic anhydride and 15 drops of pyridine are added. The mixture is refluxed for one hour, and cooled, precipitating a yellow solid which is filtered off, washed with isopropanol and crystallized from acetonitrile, to give the title compound with M.P. 182–184° C.

EXAMPLE 15

5-acetyl-4-amino-2-methylamino-thiophene-3-N-methylcarboxamide

A solution of the sodium salt of 2-cyano-3-mercapto-3-methylamino-N-methylacrylamide is prepared by adding to 0.2 mole of sodium in 250 ml. of ethanol 0.2 mole of N-methylcyanoacetamide followed by 0.2 mole of methyl isothiocyanate and keeping the solution under reflux for one hour. To this solution, while still warm 0.23 mole of chloro-2-propanone is added very slowly through the dropping funnel with constant stirring. The mixture is refluxed for one hour, cooled and the solid formed is filtered off, washed with 400 mls. of water and crystallized from either acetonitrile or 2-methoxy ethanol, to yield the title compound with M.P. 221–223° C.

EXAMPLE 16

4-amino-2-anilino-5-benzoylthiophene-3-carboxylic acid ethyl ester

To a cold solution of sodium ethoxide (0.1 mole of sodium in 50 ml. of ethanol), 0.1 mole of ethyl cyanoacetate is added. The solution is cooled and 0.1 mole of phenyl isothiocyanate is added. The mixture is cooled for three minutes and left at room temperature for one hour. It is then poured in 250 ml. of water and acidified with 50% hydrochloric acid. 3-anilino-2-cyano-3-mercaptoacrylic acid ethyl ester is obtained as a yellow solid and is recrystallized from ethanol, $$\gamma_{max.}^{CHCl_3}\ 3160,\ 2575,\ 2210,\ 1660\ cm^{-1}$$

To a 250 ml., three-neck, round bottom flask, fitted with a mechanical stirrer, a condenser and a dropping funnel, 0.02 mole of sodium in 100 ml. of ethanol are added. 3-anilino-2-cyano-3-mercaptoacrylic acid ethyl ester (0.02 mole) is added at 40–60° C. 2-chloroacetophenone (0.02 mole) in 50 ml. of ethanol is added very slowly through the dropping funnel with constant stirring, and the mixture is refluxed for one hour and filtered. Water is added and the yellow solid obtained is filtered. It is chromatographed on silicic acid and eluted with benzene containing 2% ethyl acetate. The solvent is evaporated from the eluate and the residue is crystallized from acetone-water or from methylcyclohexane to give the title compound with M.P. 138–139° C.

EXAMPLE 17

5-acetyl-4-amino-2-benzylaminothiophene-3-carboxylic acid ethyl ester

Chloro-2-propanone (0.05 mole) is added to an ethanolic solution of the sodium salt of 2-cyano-3-benzylamino-3-mercaptoacrylic acid ethyl ester (prepared from 0.05 mole sodium, 0.05 mole benzylisothiocyanate and 0.05 mole ethyl cyanoacetate) in the manner described in Example 1, and the mixture is refluxed for two hours. The ethanol is evaporated and the residue dissolved in chloroform, washed with water, dried over sodium sulfate and the oil resulting upon evaporation is crystallized from acetone, ethyl acetate, toluene and isopropanol, to give the title compound with M.P. 130° C.

EXAMPLE 18

5-acetyl-4-amino-2-(tert.-butylamino)thiophene-3-carboxylic acid ethyl ester In a one litre, 3-neck, round bottom flask fitted with a mechanical stirrer, a condenser and a dropping funnel, 0.25 mole of 2-chloropropanone is added dropwise through the dropping funnel with constant stirring to a warm ethanolic solution of 2-cyano-3-mercapto-3-(tertiary butylamino)acrylic acid ethyl ester, prepared by adding to 0.2 mole of sodium in 300 ml. of absolute ethanol 0.2 mole of ethyl cyanoacetate and 0.2 mole of tertiary butyl isothiocyanate, and heating for one and a half hours. The mixture is refluxed for one and one half hours, acidified with acetic acid, cooled, evaporated to dryness, and the residue is dissolved in chloroform and washed with water. Evaporation of the solvent leaves a black oil which is passed through a column of alumina (activity I). Elution with 10% and 25% ethyl acetate in benzene, followed by evaporation of the solvent, dissolving the residue in hexane, cooling to −60° C., filtering, and recrystallizing from methylcyclohexane (charcoal) yields the title compound with M.P. 88–90° C.

EXAMPLE 19

5-acetyl-4-amino-2-cyclohexylaminothiophene-3-carboxylic acid ethyl ester

In a 250 ml., 3-neck, round bottom flask fitted with a mechanical stirrer, a condenser and a dropping funnel, 0.06 mole of 2-chloropropanone is added slowly with constant stirring to the warm solution in ethanol of the sodium salt of 2-cyano-3-cyclohexylamino-3-mercaptoacrylic acid ethyl ester prepared by adding to 100 ml. of absolute ethanol 0.05 mole of sodium, 0.05 mole of ethyl cyanoacetate and 0.05 mole of cyclohexyl isothiocyanate and keeping the solution under reflux for one hour. The mixture is then refluxed for two hours, cooled, evaporated to dryness, and the residue dissolved in chloroform, acidified with acetic acid and washed with 300 ml. of water. Evaporation of the solvent leaves a black oil which is passed through a column of alumina (activity I). The compound is eluted with 10% ethyl acetate in benzene. The pure fractions are combined and the resulting oil crystallized from hexane with a few drops of acetone and cooling. The solid is filtered off and crystallized from methylcyclohexane and hexane, to give the title compound with M.P. 80–82° C.

I claim:
1. A compound selected from those compounds having the formula

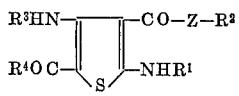

wherein $R^1$ is selected from alkyl groups containing from one to four carbon atoms, allyl, phenyl, 3-nitrophenyl, benzyl and cyclohexyl; Z represents NH or O; $R^2$ is selected from alkyl groups containing from one to two carbon atoms, phenyl, dimethylamino and piperidino; $R^3$ is selected from hydrogen and acetyl; and $R^4$ is selected from methyl phenyl, 4-chlorophenyl and 4-biphenylyl.

2. A compound as described in claim 1 which is: 4-amino-2-anilino - 5 - benzoylthiophene-3-N-methylcarboxamide.

3. A compound as described in claim 1 which is: 4-amino-2-anilino-5-benzoylthiophene-3-carboxanilide.

4. A compound as described in claim 1 which is: 4-amino-2-anilino-5-(4-phenylbenzoyl) - thiophene-3-carboxanilide.

5. A compound as described in claim 1 which is: 4-amino-2-anilino-5-(4-phenylbenzoyl) - thiophene-3-N-methylcarboxamide.

6. A compound as described in claim 1 which is: 4-amino-5-benzoyl-2-(3-nitroanilino) - thiophene carbanilide.

7. A compound as described in claim 1 which is: 4-amino - 5 - benzoyl-2-(3-nitroanilino)-thiophene-3-N-methylcarboxamide.

8. A compound as described in claim 1 which is: 4-amino-2-anilino-5-(4-chlorobenzoyl) - thiophene-3-N-methylcarboxamide.

9. A compound as described in claim 1 which is: 4-amino-5-benzoyl-2-methylamino-thiophene-3-N-methylcarboxamide.

10. A compound as described in claim 1 which is: 5-acetyl-4-amino-2-anilinothiophene-3-carboxanilide.

11. A compound as described in claim 1 which is: 3-allylamino-4-amino - 5 - benzoylthiophene-3-N-methylcarboxamide.

12. A compound as described in claim 1 which is: 4-amino-2-anilino - 5 - benzoylthiophene-3-carboxylic acid N,N-dimethyl hydroxide.

13. A compound as described in claim 1 which is: 4-amino-2-anilino - 5 - benzoylthiophene-3-N-piperidinocarboxamide.

14. A compound as described in claim 1 which is: 4-acetamido-2-anilino - 5 - benzoylthiophene-3-N-methylcarboxamide.

15. A compound as described in claim 1 which is: 5-acetyl-4-amino-2-methylamino - thiophene-3-N-methylcarboxamide.

16. A compound as described in claim 1 which is: 4-amino-2-anilino - 5 - benzoylthiophene-3-carboxylic acid ethyl ester.

17. A compound as described in claim 1 which is: 5-acetyl-4-amino - 2 - benzylaminothiophene-3-carboxylic acid ethyl ester.

18. A compound as described in claim 1 which is: 5-acetyl-4-amino - 2 - (tert-butylamino)thiophene-3-carboxylic acid ethyl ester.

19. A compound as described in claim 1 which is: 5-acetyl-4-amino - 2 - cyclohexylaminothiophene-3-carboxylic acid ethyl ester.

20. The process which comprises reacting, in solution in a lower alkanol, an isothiocyanate of formula $R^1NCS$ wherein $R^1$ is selected from lower alkyl containing from one to four carbon atoms, allyl, phenyl, 3-nitrophenyl, benzyl and cyclohexyl, with substantially one molar equivalent of an alkali metal salt of a cyanoacetic acid derivative of formula NC—CH(Met)—CO—Z—$R^2$, wherein Met represents an alkali metal, Z represents NH or O, and $R^2$ is selected from lower alkyl groups containing from one to two carbon atoms, phenyl, dimethylamino and piperidino, thereby obtaining the corresponding alkali metal salt of the 3-amino-2-cyano-3-mercaptoacrylic acid derivative of a compound of the formula

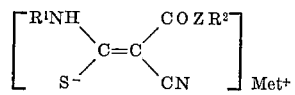

wherein $R^1$, $R^2$, Z and Met are as above defined; and treating said last-named compound with substantially one molar equivalent of a halomethyl ketone of formula $R^4COCH_2X$ wherein $R^4$ is selected from methyl, phenyl, 4-cholorphenyl and 4-biphenylyl, and X is selected from chlorine and bromine, said treatment being carried out in a lower alkanol; and recovering a compound of formula

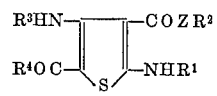

wherein $R^3$ is selected from hydrogen and acetyl, and $R^1$, $R^2$ and $R^4$ and Z are as above defined.

References Cited

UNITED STATES PATENTS 3,303,201   2/1967   Stecker _____ 260—332.2

HENRY R. JILES, Primary Examiner

S. D. WINTERS, Assistant Examiner

U.S. Cl. X.R.

260—332.2, 465, 465.4, 464; 424—267, 275